(12) United States Patent
Mutschler et al.

(10) Patent No.: US 7,339,158 B2
(45) Date of Patent: Mar. 4, 2008

(54) ROTARY ENCODER

(75) Inventors: Reinhold Mutschler, Villingen-Schwenningen (DE); Dieter Gelbke, Donaueschingen (DE); Josef Siraky, Donaueschingen (DE)

(73) Assignee: Sick Stegmann GmbH, Donaueschingen (DE)

( * ) Notice: Subject to any disclaimer, the term of this patent is extended or adjusted under 35 U.S.C. 154(b) by 0 days.

(21) Appl. No.: 11/502,620

(22) Filed: Aug. 11, 2006

(65) Prior Publication Data

US 2007/0034787 A1    Feb. 15, 2007

(30) Foreign Application Priority Data

Aug. 12, 2005  (DE) ...................... 10 2005 038 570

(51) Int. Cl.
*G01D 5/34*   (2006.01)
*B23B 31/12*  (2006.01)
(52) U.S. Cl. ..................... 250/231.13; 279/53
(58) Field of Classification Search ............. 250/231.1, 250/231.13, 231.14; 279/51, 53, 110, 121, 279/123; 82/147, 165
See application file for complete search history.

(56) References Cited

U.S. PATENT DOCUMENTS

| | | | | |
|---|---|---|---|---|
| 6,572,119 B2 * | 6/2003 | Selb | ............................. | 279/52 |
| 7,205,530 B2 * | 4/2007 | Jones | ..................... | 250/231.13 |
| 2005/0161889 A1 * | 7/2005 | Casel | .......................... | 279/43 |

FOREIGN PATENT DOCUMENTS

| | | |
|---|---|---|
| DE | 102 15 997 A1 | 10/2002 |
| DE | 103 61 886 B3 | 1/2005 |
| EP | 0 533 973 A1 | 3/1993 |
| EP | 0 682 229 A1 | 11/1995 |
| EP | 1 517 120 | 3/2005 |

\* cited by examiner

*Primary Examiner*—Kevin Pyo
(74) *Attorney, Agent, or Firm*—The Nath Law Group; Jerald L. Meyer; Jonathan A. Kidney (57) ABSTRACT

A rotary encoder is clamped coaxially with its pickup shaft (14) on a drive shaft (12) which is to be measured. Two collet chucks are provided for this purpose. The one collet chuck is constructed as a clamping sleeve, which penetrates the pickup shaft (14) axially and has clamping jaws (34) on its free end. The other collet chuck is constructed as a clamping ring, which engages the pickup shaft (14) with clamping jaws (38). The two collet chucks are clamped axially against each other and against the pickup shaft (14) by a force element (40).

14 Claims, 7 Drawing Sheets

ROTARY ENCODER

The invention relates to a rotary encoder according to the introductory clause of a rotary encoder having a pickup shaft (14) that can be slid coaxially onto a drive shaft (12) that is to be measured and clamped on the drive shaft (12) by means of a collet chuck apparatus, characterized in that the pickup shaft (14) is constructed as an axially continuous hollow shaft through which the drive shaft (12) is coaxially insertable; the collet chuck apparatus has two collet chucks (26, 28) that each clamp the pickup shaft (14) on the drive shaft (12) with clamping jaws (34, 38) on the opposing ends of the pickup shaft); the one collet chuck penetrates the pickup shaft (14) coaxially as a clamping sleeve (26); and a force element (40, 48) exerts an axial force on the two collet chucks (26, 28), whereby the collet chucks (26, 28) are movable against each other and against the pickup shaft (14) in order to produce the clamping force of their respective clamping jaws (34, 38).

Rotary encoders are used to measure angle dimensions, such as angle position, angular speed, angular acceleration of rotating parts, in particular of the shaft of a motor. The rotary encoder has a pickup shaft that is coupled in a rotationally fixed connection to the drive shaft which is to be measured. Together with the pickup shaft, directly or through a geared connection, a measurement standard rotates, which is sensed by a suitable scanning system, for example optically or magnetically.

In order to couple the pickup shaft with the drive shaft that is to be measured in a simple manner that also permits a great variety of applications, a rotary encoder known from EP 0 682 229 A1 of the type named at the beginning has a pickup shaft that is placed coaxially on the drive shaft and is clamped onto the drive shaft by means of a collet chuck located in the pickup shaft. Since the drive shaft sits here in a blind hole in the pickup shaft, the axial arrangement of the rotary encoder in relation to the drive shaft is fixed. The exact axial alignment of the pickup shaft with the drive shaft is ensured only by the collet chuck.

The problem underlying the invention is to create a rotary encoder that can be mounted on a drive shaft in a simple manner with greater variety and with high precision.

This problem is solved according to the present invention by a rotary encoder having the features of a rotary encoder having a pickup shaft (14) that can be slid coaxially onto a drive shaft (12) that is to be measured and clamped on the drive shaft (12) by means of a collet chuck apparatus, characterized in that the pickup shaft (14) is constructed as an axially continuous hollow shaft through which the drive shaft (12) is coaxially insertable; the collet chuck apparatus has two collet chucks (26, 28) that each clamp the pickup shaft (14) on the drive shaft (12) with clamping jaws (34, 38) on the opposing ends of the pickup shaft); the one collet chuck penetrates the pickup shaft (14) coaxially as a clamping sleeve (26); and a force element (40, 48) exerts an axial force on the two collet chucks (26, 28), whereby the collet chucks (26, 28) are movable against each other and against the pickup shaft (14) in order to produce the clamping force of their respective clamping jaws (34, 38).

Advantageous embodiments of the invention are indicated in the subordinate claims.

According to the invention, the pickup shaft is constructed as a continuous hollow shaft that can be slid onto the drive shaft which is to be measured. The hollow pickup shaft is clamped onto the drive shaft by two collet chucks, each of which operates on an end of the pickup shaft. That enables the pickup shaft, and with it the entire rotary encoder, to be clamped in any axial position desired on the drive shaft, so that great flexibility in utilization and in the mounting options results. Clamping the pickup shaft by means of the collet chucks results in high torsional strength of the coupling between the pickup shaft and the drive shaft. The clamping by means of the collet chucks adapts to the diameter of the drive shaft, so that the rotary encoder is usable for a certain range of diameters and assumes diameter tolerances of the drive shaft. The clamping of the pickup shaft by means of a collet chuck at each of its two ends results in good axial positioning of the pickup shaft in relation to the axis of the drive shaft, so that high precision of concentricity of the rotary encoder is achieved.

One of the collet chucks is designed as a clamping sleeve, which passes through the hollow pickup shaft coaxially. As a result, both collet chucks are accessible at the same end of the pickup shaft, and a force element is able to exert an axial force on both collet chucks. The collet chucks are subjected to an axial force against each other and against the pickup shaft and are clamped. This enables simple mounting, since only a single force element is necessary to clamp the collet chucks at both ends of the pickup shaft.

Preferably each of the collet chucks clamps with conical surfaces between the pickup shaft and the drive shaft. Preferably each of the collet chucks is constructed here with a circumferential flange; the force element acts on the circumferential flanges of the two collet chucks and moves them axially against each other. That causes the one collet chuck to be pressed axially into the pickup shaft, while the other collet chuck in the form of a clamping sleeve at the opposite end of the pickup shaft is pulled into the latter.

For assembly and disassembly the collet chucks can be held in their inoperative position by an unlocking device.

The force element can be constructed as a spring, for example, which is inserted between the circumferential flanges of the collet chucks and presses them apart. In a different embodiment, the force element can be a wedge ring that intervenes between the circumferential flanges to press them apart axially. In another embodiment, the clamping element can be a clamping ring that reaches around the circumferential flanges of the collet chucks from outside, acts on conical outside surfaces of the circumferential flanges, and pulls these axially against each other.

Since the pickup shaft, and hence the rotary encoder as a whole comes into contact with the drive shaft only through the collet chucks, the rotary encoder can be reliably insulated electrically from the drive shaft in a simple manner, by making the collet chucks from an electrically insulating material, in particular a synthetic material.

The invention will be explained in greater detail below on the basis of exemplary embodiments depicted in the drawing. The figures show the following.

Figure 1:
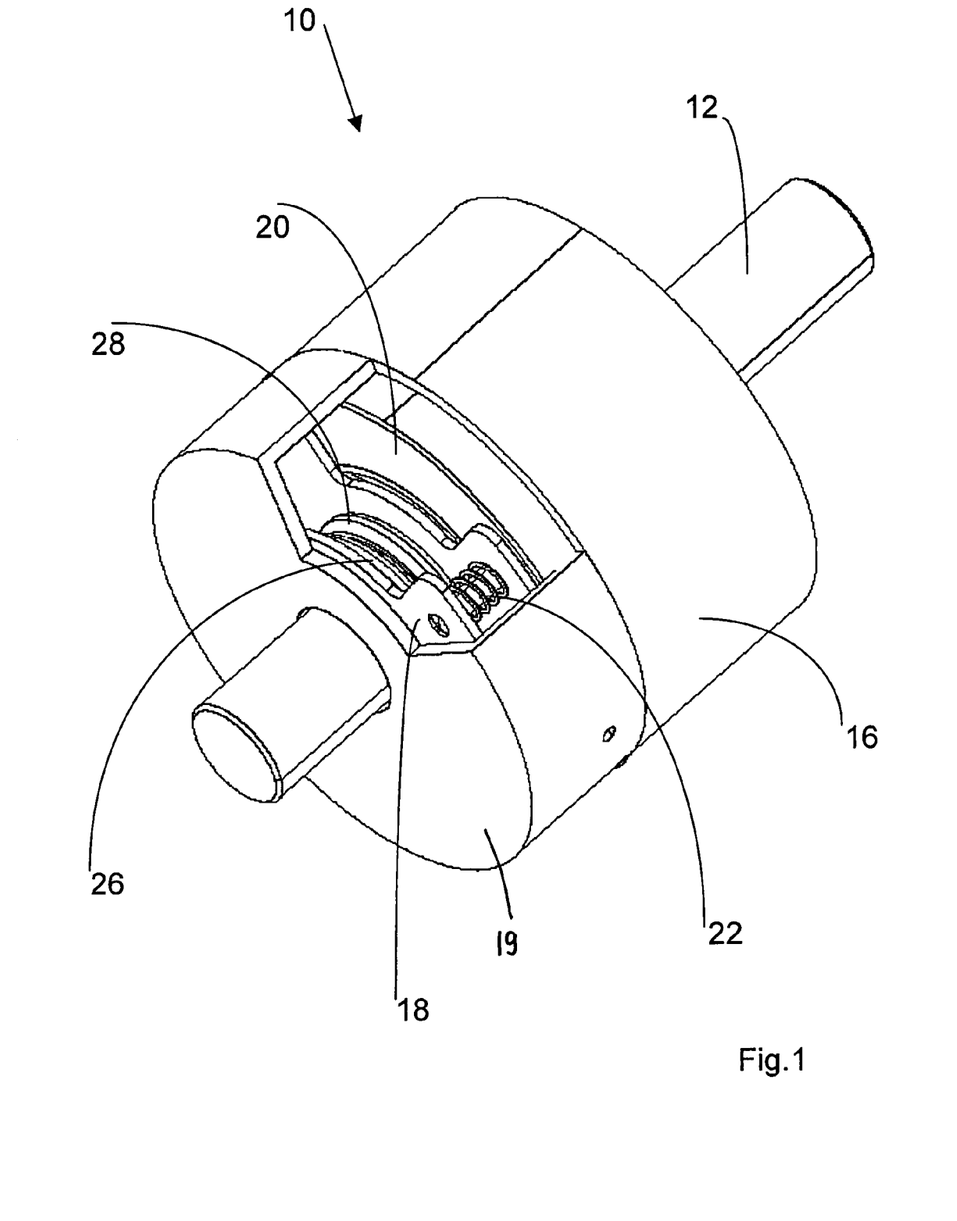
FIG. 1: a perspective view of a rotary encoder clamped on a drive shaft, with partially cutaway housing.
Figure 2:
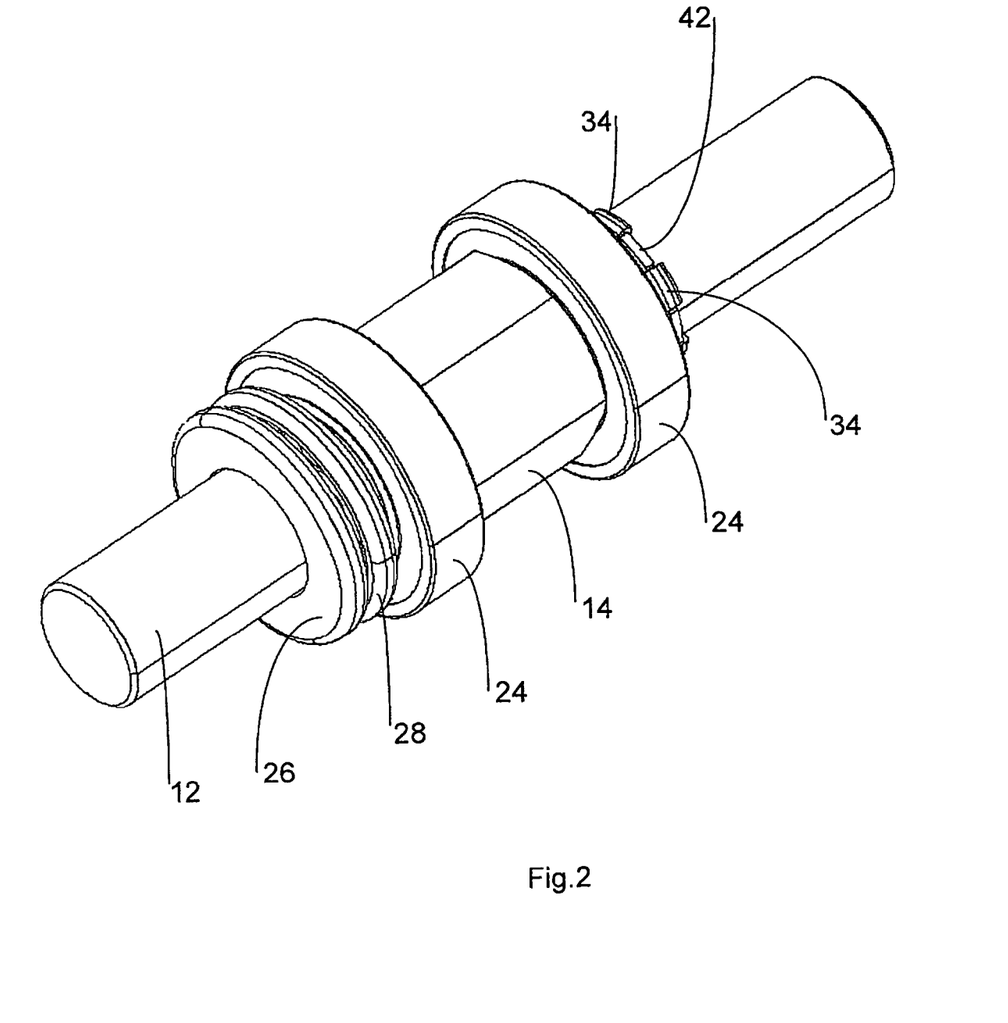
FIG. 2: a perspective view of the pickup shaft clamped on the drive shaft.
Figure 3:
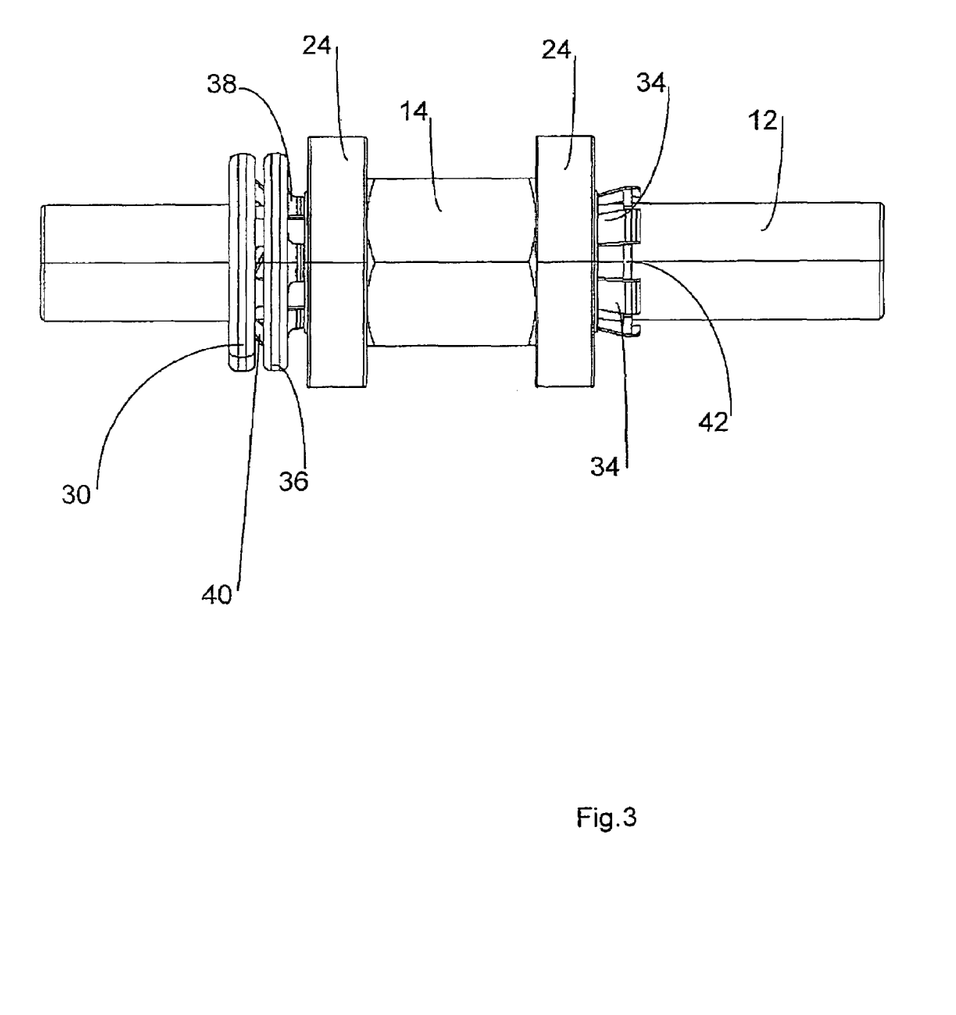
FIG. 3: a side view of the pickup shaft clamped on the drive shaft.

FIG. 1 shows a rotary encoder 10 that is used to measure angle dimensions of a drive shaft 12. The drive shaft 12 is, for example, the shaft of an electric motor, whose angular position, angular velocity and possibly angular acceleration are measured by means of the rotary encoder 10 in order to regulate the electric motor, for example, for a servo drive.

The rotary encoder 10 has a pickup shaft 14, which is coupled with the drive shaft 12 in a rotationally fixed connection in the manner described in detail below. With the pickup shaft 14 rotates a measurement standard, which consists, for example, of an incremental disk or a code disk. The measurement standard is scanned by a scanning system, which is in a stationary position in an internal housing part 20 of the housing 16 of the rotary encoder 10. The pickup shaft 14 is rotatably supported in the housing part 20. The housing 16 is mounted on the motor housing of the drive shaft 12 with a rotationally fixed attachment, so that the scanning process measures the angular position of the drive shaft 12 in reference to the motor housing. To absorb centering and alignment errors when attaching the rotary encoder 10 to the motor to be measured, the rotary encoder 10 is mounted on the motor housing in a torsionally rigid but resilient mounting with a stator clutch, which is not shown.

The object of the invention is the coupling of the pickup shaft 14 with the drive shaft 12.

In a first embodiment, portrayed in FIGS. 1 through 4, the pickup shaft 14 is in the form of a hollow shaft whose inside diameter is chosen so that the pickup shaft 14 can be slid onto the drive shaft 12 with radial play. The inner ring of a radial roller bearing 24 is pressed onto each of the axial ends of the pickup shaft 14. The outer ring of the radial roller bearing 24 carries the housing part 20 with the scanning system. The pickup shaft 14, and hence the rotary encoder 10, can be adjusted and positioned axially as desired on the drive shaft 12, after which the pickup shaft 14 and hence the rotary encoder 10 are clamped onto the drive shaft 12 in the manner described below.

To the clamp pickup shaft 14 on the drive shaft 12 two collet chucks are used, one of which is constructed as a clamping sleeve 26 and the other as a clamping ring 28.

Figure 4:
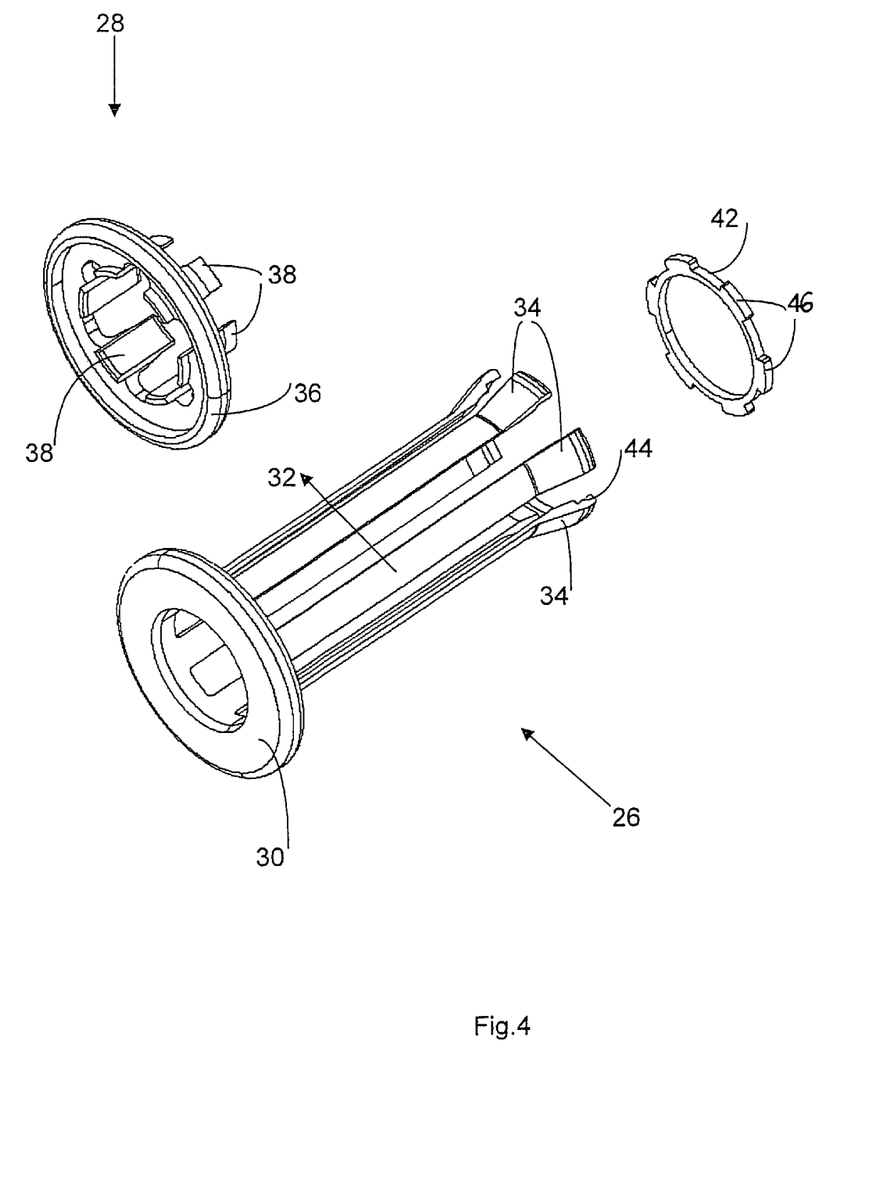
FIG. 4: an exploded perspective view of the collet chuck apparatus of this rotary encoder.

The clamping sleeve 26 has a circumferential flange 30, on which clamping arms 32 are formed. The circumferential flange 30 has essentially the shape of a circular disk, whose free inside cross section corresponds essentially to the circumferential cross section of the drive shaft 12. The clamping arms 32 are formed on the inner rim of the circumferential flange 30, and are in the form of axial tongues that are positioned at equal angular intervals and are separated from each other by axial slits. In the exemplary embodiment shown there are six clamping arms 32, each offset from each other by 60°. The axial length of the clamping arms 32 is greater than the axial length of the pickup shaft 14. At their end opposite the circumferential flange 30 the clamping arms 32 turn into clamping jaws 34; toward the center axis of the clamping sleeve 26 they have a conical outer surface that rises radially toward the free end of the clamping arms 32.

The clamping ring 28 also has a circumferential flange 36, which has the shape of a circular ring disk. The free inside diameter of the circumferential flange 36 corresponds to the outside circumferential diameter of the clamping arms 32. On the inside circumference of the circumferential flange 36 clamping jaws 38 are formed, which are offset from each other at an angle and spaced so that they engage the axial slits between the clamping arms 32 when the clamping ring 28 is slid onto the clamping sleeve 26. The clamping jaws 38 point from the circumferential flange 36 in the same direction as the clamping arms 32 of the clamping sleeve 26, and are formed with a conical surface toward the middle axis, which drops off radially from the circumferential flange 36 to the free end of the clamping jaws 38.

Between the faces of the circumferential flanges 30 and 36 that face each other a rippled spring washer 40 is inserted, which presses the circumferential flanges 30 and 36 apart axially.

To assemble the individual parts of the rotary encoder 10, first the rippled spring washer 40 is slid onto the clamping sleeve 26 from the free end of the clamping arms 32. Then the clamping ring 28 is slid onto the clamping sleeve 26, also from the free end of the clamping arms 32, with the circumferential flange 36 of the clamping ring 28 facing toward the circumferential flange 30 of the clamping sleeve 26 and the rippled spring washer 40. When the clamping ring 28 is slid onto the clamping sleeve 26, the clamping jaws 38 of the clamping sleeve 28 engage the free slits between the clamping arms 32 of the clamping sleeve 26. At the same time, the clamping jaws 38 fit the outer circumference of their free ends into the outside circumference of the clamping jaws 32 and rise radially toward the circumferential flange 36 above the outside circumference of the clamping arms 32. Sliding the rippled spring washer 40 and clamping ring 28 onto the clamping sleeve 26 is made possible by the fact that the clamping arms 32 and their clamping jaws 34 are pressed together with radial springing.

The hollow pickup shaft 14 or the rotary encoder 10 is then slid onto the clamping sleeve 26, to which end the clamping jaws 34 of the clamping arms 32 are again pressed together radially. The clamping arms 32 can be received if appropriate in axial slots in the inside circumference of the pickup shaft 14, so that the clamping sleeve 26 does not increase the radial dimensions. Then a support ring 42 is snapped into the free ends of the clamping arms 32. To this end, the free ends of the clamping arms 32 which are bent radially outward to form clamping jaws 34 have locking reliefs 44 into which the support ring 42 snaps. The support ring 42 has projections 46 that are directed radially outwardly, which engage the free slits between the clamping jaws 34. When snapped into place, the support ring 42 braces the outward-bent clamping jaws 34 radially, so that they can no longer be bent inward and maintain their angular distance from each other.

To mount the rotary encoder 10 on the drive shaft 12, it is necessary to relieve the clamping jaws 34 and 38 and to move them axially away from the clamping contact position on the pickup shaft 14. To this end, circumferential flanges 30 and 36 are positioned axially between unlocking plates 18. By rotating a covering cap 19 of the housing 16, inclined planes that rise in the circumferential direction are pressed against the unlocking plates 18, which causes these to be moved axially against each other and to press the circumferential flanges 30 and 36 against the force of the rippled spring washer 40 and keep them pressed together. The clamping ring 28 and the clamping sleeve 26 are thereby pushed against each other, and their clamping jaws 38 and 34 are relieved and deactivated. The rotary encoder 10 can thus be slid freely onto the drive shaft 12 and adjusted axially on it.

After the rotary encoder 10 is placed on the drive shaft 12 and the stator coupling is attached, the cover cap 19 is turned back to its rest position. The inclined planes release the unlocking plates 18 and the latter are pressed apart axially by springs 22 and moved away from the circumferential flanges 30 and 36. The rippled spring washer 40 can now become effective and shift the clamping sleeve 26 and clamping ring 28 against each other.

That causes the clamping jaws 38 of the clamping ring 28 to be pressed against the pickup shaft 14, whereupon the clamping jaws 38 are clamped radially between the inside diameter of the pickup shaft 14 and the outside diameter of the drive shaft 12. In addition, the axial force of the rippled spring washer 40 presses the circumferential flange 30 of the clamping sleeve 36 axially away from the pickup shaft 14. That causes the clamping jaws 34 formed on the opposite ends of the clamping arms 32 to be pulled axially into the pickup shaft 14 and to become clamped radially between the inside diameter of the pickup shaft 14 and the outside diameter of the drive shaft 12. This causes the pickup shaft 14 to be clamped on the drive shaft 12 at one of its axial ends by the clamping jaws 38 of the clamping ring 28, and at its other end by the clamping jaws 34 of the clamping sleeve 26.

Figure 5:
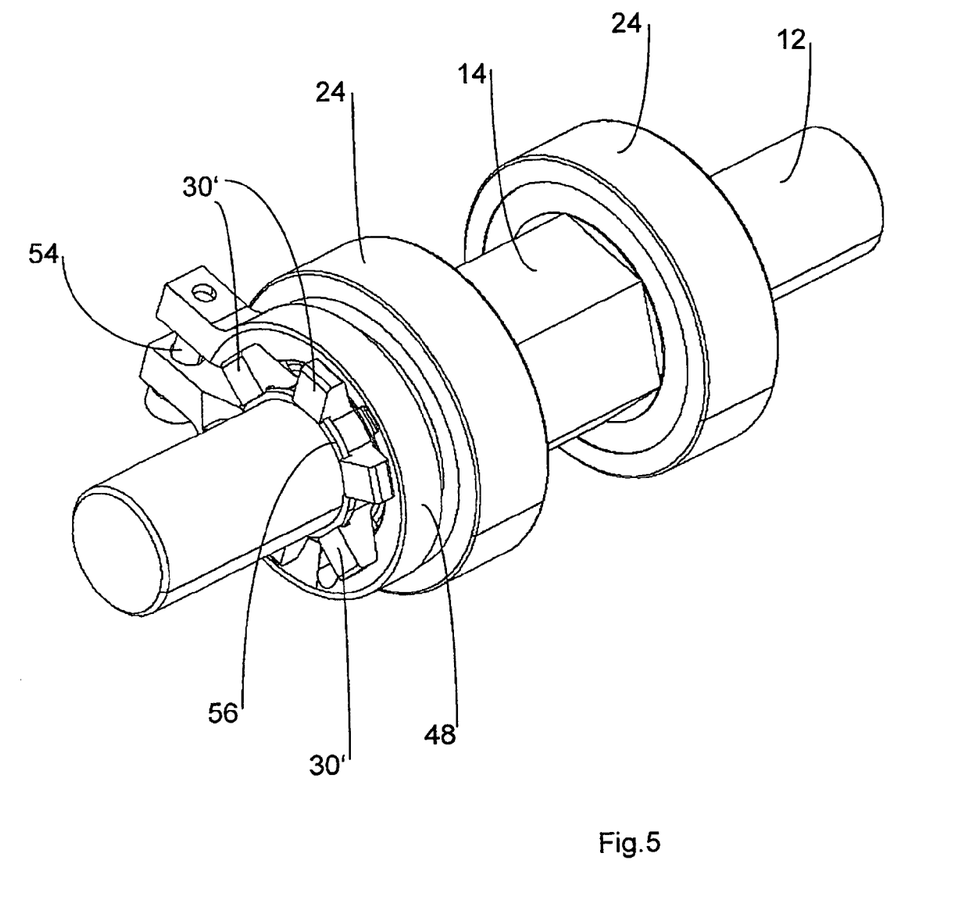
FIG. 5: a perspective view of a second embodiment of the pickup shaft clamped on the drive shaft.
Figure 6:
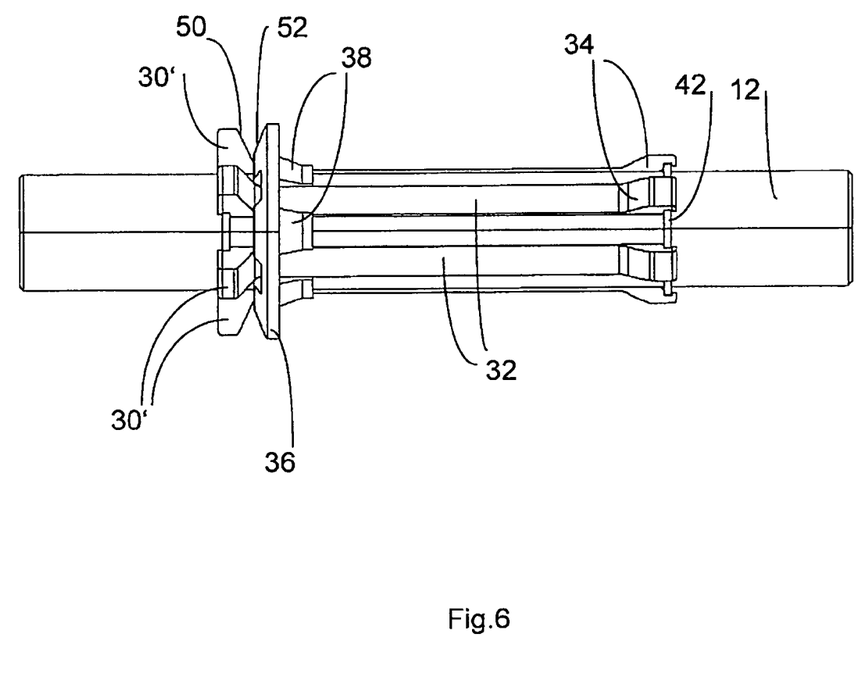
FIG. 6: the collet chuck apparatus of this second embodiment in a side view.
Figure 7:
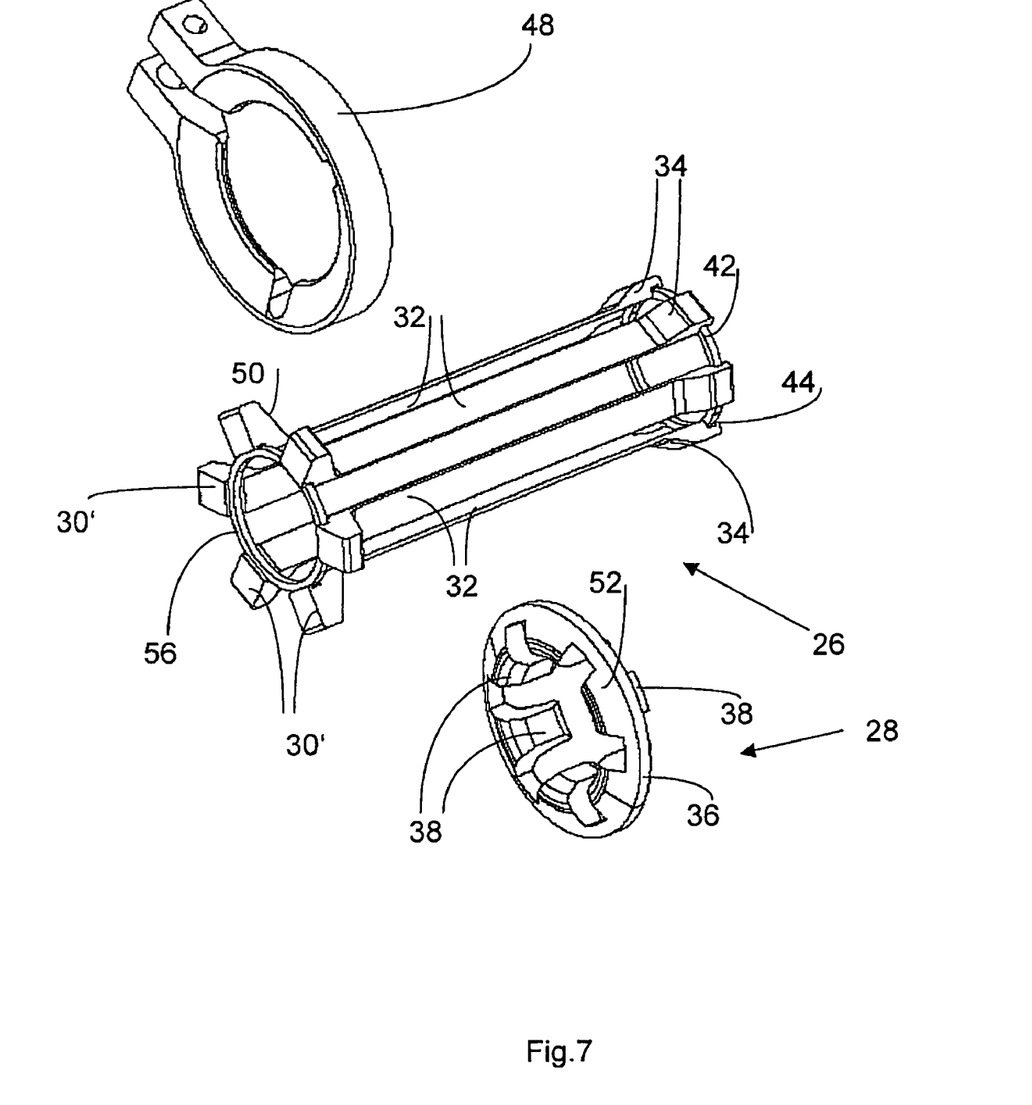
FIG. 7: an exploded perspective view of the collet chuck apparatus of this second embodiment.

A second version of the collet chuck apparatus is depicted in FIGS. 5 through 7. Wherever there is consistency with the first exemplary embodiment, the same reference labels are used and reference is made to the preceding description.

The essential difference from the first embodiment consists in the construction of the force element, which braces the clamping sleeve 26 and the clamping ring 28 against each other and against the pickup shaft 14. Instead of the rippled spring washer 40, a wedge ring 48 is used. The circumferential flange 30 of the clamping sleeve 26 and the circumferential flange 36 of the clamping ring 28 have conical beveled surfaces 50 and 52 facing each other, respectively, as can best be seen in FIG. 6. Engaged between the beveled surfaces 50 and 52 is a wedge ring 48, which is constructed for this purpose with a wedge-shaped profile cross section that tapers toward the inside. The wedge ring 48 is separated by a radial gap, and can be pulled together by means of a clamping screw 54 so that its wedge profile forces its way between the beveled surfaces 50 and 52 and presses the circumferential flanges 30 and 36 apart axially, in order to clamp the clamping ring 28 with its clamping jaws 38 and the clamping sleeve 26 with its clamping jaws 34 between the pickup shaft 14 and the drive shaft 12.

Another slight difference from the first embodiment consists in the fact that the clamping sleeve 26 is not constructed with a circumferential flange 30 that is closed in the circumferential direction. Instead of the closed circumferential flange 30, there are only flange segments 30' formed on the clamping arms 32, which are held axially, radially and in their angular position by a support ring 56. The support ring 56 corresponds in shape to the support ring 42, and is clipped into locking reliefs on the inside circumference of the flange segments 30' in a corresponding way.

In another embodiment, which is not shown, the force element can be a radially acting clamping ring with elastic zones, which acts on inclined outside surfaces of the circumferential flanges of the two collet chucks, and through them moves the collet chucks axially toward each other. That causes the clamping jaws to be pulled against the corresponding tapered contact surfaces of the pickup shaft, thus wedging the pickup shaft together with the drive shaft. The shape of the clamping sleeve 26 and of the clamping ring 28 are similar to those in FIG. 4, but with the direction of motion opposed. The clamping sleeve has penetrations in the area of the circumferential flange, through which the clamping jaws of the clamping ring can reach.

REFERENCE LABELS 10 rotary encoder
12 drive shaft
14 pickup shaft
16 housing
18 unlocking plates
19 cover cap
20 housing part
22 springs
24 radial roller bearing
26 clamping sleeve
28 clamping ring
30 circumferential flange
30' flange segments
32 clamping arms
34 clamping jaws
36 circumferential flange
38 clamping jaws
40 rippled spring washer
42 support ring
44 locking reliefs
46 projections
48 wedge ring
50 beveled surface
52 beveled surface
54 clamping screw
56 support ring

What is claimed is:

1. A rotary encoder having a pickup shaft (14) that can be slid coaxially onto a drive shaft (12) that is to be measured and clamped on the drive shaft (12) by means of a collet chuck apparatus, characterized in that the pickup shaft (14) is constructed as an axially continuous hollow shaft through which the drive shaft (12) is coaxially insertable; the collet chuck apparatus has two collet chucks (26, 28) that each clamp the pickup shaft (14) on the drive shaft (12) with clamping jaws (34, 38) on the opposing ends of the pickup shaft; the one collet chuck penetrates the pickup shaft (14) coaxially as a clamping sleeve (26); and a force element (40, 48) exerts an axial force on the two collet chucks (26, 28), whereby the collet chucks (26, 28) are movable against each other and against the pickup shaft (14) in order to produce the clamping force of their respective clamping jaws (34, 38).

2. The rotary encoder according to claim 1, characterized in that the two collet chucks (26, 28) each have a circumferential flange (30, 30', 36), and the force element (40, 48) is positioned between these circumferential flanges (30, 30', 36) and exerts a force that pushes the circumferential flanges (30, 30', 38) apart axially.

3. The rotary encoder according to claim 2, characterized in that the force element is an axially acting spring.

4. The rotary encoder according to claim 1, characterized in that an unlocking apparatus is provided by which the collet chucks (26, 28) can be held in their released position for assembly and disassembly.

5. The rotary encoder according to claim 3, characterized in that an unlocking apparatus has two unlocking plates (18) that can be pressed against each other axially by rotating a covering cap (19) of the housing (16) over inclined planes in order to press the circumferential flanges (30, 36) together against the force of the spring (40).

6. The rotary encoder according to claim 2, characterized in that the force element is a wedge ring (48).

7. The rotary encoder according to claim 1, characterized in that the two collet chucks (26, 28) each have a circumferential flange, and that the force element acts on outside surfaces of the circumferential flanges and slides them axially toward each other.

8. The rotary encoder according to claim 7, characterized in that the force element is a clamping ring that reaches around the circumferential flanges radially from outside.

9. The rotary encoder according to claim 1, characterized in that the collet chuck constructed as a clamping sleeve (26) has clamping arms (32) that axially penetrate the pickup shaft (14), at whose free ends the clamping jaws (34) are constructed.

10. The rotary encoder according to claim 9, characterized in that the clamping arms (32) can be bent flexibly inward and are supportable radially at their free end by a support ring (42).

11. The rotary encoder according to claim 9, characterized in that the second collet chuck is constructed as a clamping ring (28) that sits coaxially on the clamping sleeve (26) and reaches radially with its clamping jaws (38) between the clamping arms (32) of the clamping sleeve (26).

12. The rotary encoder according claim 1, characterized in that the collet chucks (26, 28) are made of an electrically insulating synthetic material.

13. The rotary encoder according to claim 3, characterized in that the spring is a rippled spring washer.

14. The rotary encoder according to claim 5, characterized in that an unlocking apparatus has two unlocking plates (18) that can be pressed against each other axially by rotating a covering cap (19) of the housing (16) over inclined planes in order to press the circumferential flanges (30, 36) together against the force of the spring (40).

* * * * *